Feb. 15, 1938.   T. ASH, JR.   2,108,245
GYRATORY AIRPLANE WING
Filed June 2, 1936
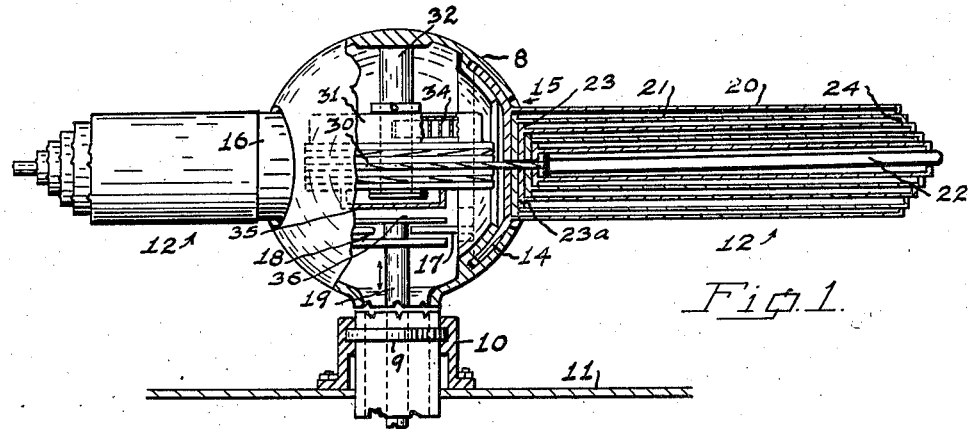
Fig.1.
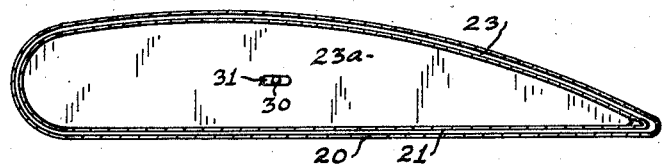
Fig.2.
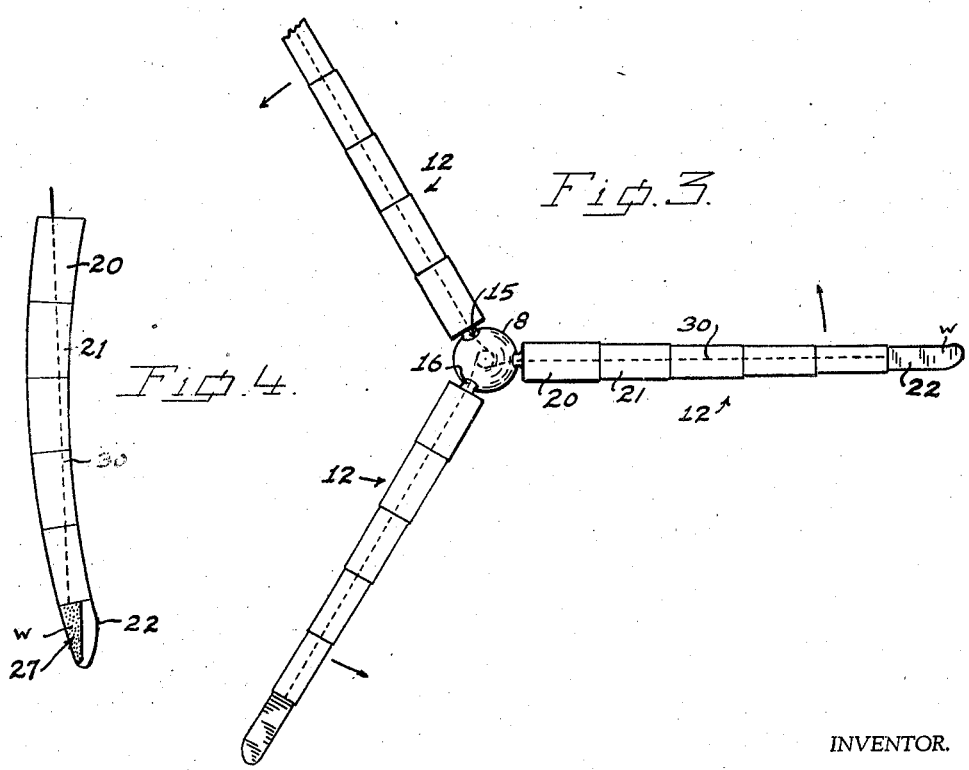
INVENTOR.
Thomas Ash. Jr.

Patented Feb. 15, 1938

2,108,245

UNITED STATES PATENT OFFICE 2,108,245

GYRATORY AIRPLANE WING

Thomas Ash, Jr., Los Angeles, Calif.

Application June 2, 1936, Serial No. 83,096

6 Claims. (Cl. 244—18)

The present invention relates to aerodynamic devices and more particularly to gyratory wings or blades for airplanes, propellers, fans and the like.

An important object of the invention, particularly where gyratory airplane wings are concerned, is the provision of a wing adapted to the peculiar aerodynamic and structural requirements, whereas the usual gyratory wing is in many respects not unlike fixed wings, both as regards rigidity and aerodynamic considerations.

The usual gyratory wing is rigid in order to remain suitably extended when centrifugal force is not particularly strong, altho such wings are frequently pivoted at the root to permit of the coning action peculiar to gyratory wings. It appears however that the ideal gyratory wing should be decidedly flexible at all points along its span in order to adapt itself to the constantly changing stresses to which it is subject, and in order to perform at better efficiency in all positions of gyration. It is a well recognized fact that members subject to constantly changing stresses should not have too much rigidity. It is obvious that a decidedly flexible gyratory wing will, by reason of centrifugal force, tend to maintain correct position when gyrating, whereas such a wing is considered utterly impractical when gyratory speed is reduced.

Notwithstanding the paradox, it is an important object of this invention to provide a gyratory wing which is decidedly practical while being so flexible thruout its span as to depend entirely upon centrifugal force to keep it suitably positioned.

Another and highly important object of this invention is to provide a wing in which the chord and thickness decrease from the root outwardly while the angle of incidence or built-in angle of attack changes (increases) from the tip inwardly toward the root. The advantages of such a wing are manifold; one being that each portion of the wing may be designed for maximum efficiency at the particular speed at which it is to travel. In fact I find that a considerable saving in power for a given lift and speed results from designing a gyratory wing in conformity with the fact that outer portions of the wing travel faster than inner portions. Another advantage from a structural standpoint is that lift may be more evenly distributed over the full span of the wing and load concentration adjacent to the tips is suitably obviated. Still another advantage is that when the wing or blade with which my invention is concerned is used for helicopter effects, it will be found that the blade has a spiral pitch. To incorporate an appreciable spiral pitch in large blades for gyratory-winged planes and the like has heretofore involved many structural difficulties.

Light weight is of course an important consideration and it is an object of this invention to provide light weight notwithstanding the fact that the new wing depends upon centrifugal force to produce effective rigidity. In this connection it is another object of the invention to provide for disposing the major weight near the tip where centrifugal force is more pronounced.

Another object of the invention is to provide a wing which notwithstanding its flexibility may be readily accelerated from rest particularly where directly applied power is employed to start the wings in gyratory motion, or, where power is employed together with increased angle of attack to provide for jump-take offs.

Another object of the invention is to provide a wing of the class described which will permit of changeable-pitch control and which will automatically prevent stalling or loss of rotative speed should the pitch be changed too abruptly.

One of the major difficulties with all types of planes is that the total wing area required for take-off and landing, is not required in flight and as a consequence much power is consumed in the resistance offered by a wing span greater than is required in flight.

It is an object of the invention to provide a wing which may be varied as to span and area. In this connection it is another object of the invention to provide a gyratory wing which will automatically change its span or lifting surface to adapt itself to conditions, and it is a further object to provide also for manual control to meet special conditions. For example, the invention provides for materially decreasing the span and area in a dive. The invention also provides for adjusting the span according to altitude, wind velocity, load, and other changing conditions.

Another object which relates in general to all gyrating airfoils is to provide for changing the effective rigidity produced by centrifugal force. For example, at times the centrifugal effect of the gyrating mass and particularly of the tip portions, may produce greater effective rigidity than is required. In such case the invention provides for taking the thrust of a part of the mass directly on the hub or pylon rather than having it carried directly thru the wing. This provides for maximum rigidity when the blade or wing is being used as a propeller and for reducing the effective rigidity to provide greater flexibility when the blades are gyrating automatically.

Torsion or twist at the outer ends of gyratory wings present structural difficulties in former types and it is an object of this invention to structurally offset such twist or torsion while retaining light weight construction. This is accomplished by this invention with a unique construction, altho it will be seen that the decreased angle of incidence toward the tip provides a wing which is subject to less torsion than that found in a wing of more uniform angle of incidence.

Other objects and advantages of my invention include:—a greatly increased efficiency in the form of more L/D and more speed for a given motor; greater speed when required by reducing the span as well as the angle of attack; adjustment of angle of attack to meet varying conditions such as providing more lift when required or reducing the drag when only a low angle is then required; greater stability; low cost of manufacture and low cost of replacement of damaged portions; increased safety; and all-metal construction.

My invention provides an articulated wing built up of a number of standard short sections each of which is in itself decidedly strong altho of light weight and having only one rib. These sections are preferably of metal and the invention thereby permits of making these sections in the form of light-weight seamless metal tubes having a cross section corresponding to the required airfoil section. Such construction permits of providing a great variety of wings from a few standardized manufactured sections any one of which is quickly replaced. This ready replacement of wing sections means that the owner of a plane has at his disposal a variety of types and sizes of wings by investing in a few extra sections.

Last but highly important, the invention has for an object to provide, and it does provide, an airplane which may be parked in a space no wider and no longer than the body of the plane, and in which plane the wings practically disappear the instant the rotor comes to a stop, and, appear again only when the rotor is again gyrated.

I have illustrated my invention by the accompanying drawing which shows an aerodynamic rotor suited for use as a fan, or as a propeller, or as a paddle wing, or as the rotor of any type of gyratory-winged plane, or as any useful combination of the above; for either power drive or automatic rotation or both.

Figure 1 of the drawing is a small scale vertical section of such a rotor.

Figure 2 is a cross section, on larger scale than Figure 1, taken thru one of the wings or blades of the rotor.

Figure 3 is a plan view of the rotor in operative position, this view being on an even smaller scale than Figure 1.

Figure 4 is a diagram of a modified form of wing or blade.

The reference numeral 8 indicates a hub having a thrust-ring or collar 9 having its bearing in a stationary member 10. By this member the rotor is supported by or acts to support the object 11, which latter may be an airplane body. Regardless of the function of the rotor the features illustrated and described are all useful and advantageous, altho in the ensuing description it will be first assumed that the object 11 is an airplane.

A plurality of blades or wings 12, 12, 12, project radially from the hub and each has its end universally pivoted in the hub as at 14. The corresponding opening 15 of the hub thru which the corresponding pivoted end of the blade or wing projects, is only slightly larger than the diameter of the blade at 16 so that each blade has only limited movement in the horizontal and vertical planes. The universal pivot of each wing does however provide for rolling of the blade around its longitudinal axis to provide for changing the pitch or angle of attack.

To the pivoted end of each blade within the hollow of the hub is attached a projecting pin 17 which is moved in a direction generally axially of the hub to rock the blades to provide for changing their pitch or angle of attack. A push-rod, preferably non-rotatable, or independently rotatable with respect to the hub, is disposed axially internally of the hub and projects outwardly of the same so that the operator may impart axial movement to this rod. The rod is provided at the end within the hub, with a circumferential groove 18 in which the pins 17 are disposed. This groove permits of the pins travelling with the hub without imparting rotation to the push rod. In the art of changeable-pitch propellers and the like means for moving such rods to change the angle of the blades, and means for locking such rods as required against axial and rotary movements, are all well understood and accordingly are not illustrated or described herein. While changeable pitch blades and their control is a known art, this feature is novel in the present device by reason of its combination and its co-operation with other novel features.

A salient feature of the invention resides in the provision of wings which may be folded or retracted to reduced or minimum span and while various forms of such blades may be employed and while various means for providing a retractile wing may be employed, each blade is here shown as composed of a plurality of telescoping sections 20, 21, 22, etc., all articulated to form a complete wing which may be moved from the compact retracted position shown in Figure 1, to the fully expanded position shown in Figure 3, and vice-versa, and which wings or blades may be disposed in any intermediate position as required.

Each section is provided at its inner end with a web or rib of airfoil section and each having both its chord and thickness slightly greater than the metal tubular portion of the section in order to provide a shoulder 23 at the corresponding end. Each shoulder is a running fit in the next larger adjacent section. At the outer end each section is provided with an internal shoulder 24 which reinforces the section at that end and which is a working fit over the next smaller section.

It will be apparent now that each section may be constructed, if desired, in the form of a metal tube of airfoil cross section and by reason of the web at one end and the shoulder at the other is rigid, durable, fire-proof, low in cost and well resistant to deformation or collapse altho of light weight.

While differences of angle of incidence are so slight as not to be indicated in the drawing, it will be understood that each section from the tip section 25 inwardly to the root section 26, is to be of increasing angle of incidence and this is predetermined by having the shoulders offset slightly with respect to the outer surface of adjacent sections so that adjacent sections are not disposed both at the same angle of attack. It will be apparent now that this invention provides a wing, which when extended, has decreasing angle of attack, decreasing chord, and decreasing thickness outwardly from root to tip, and with each section so designed for its particular relative speed, the wing should show 25% more L/D and 10% more speed for the same power.

In conformity with a salient feature of the invention the tip of each wing or blade is given appreciable weight and is accordingly designated by the numeral W to indicate weight. This weight may be provided by making the tip as a heavy forging or casting or the tip may be hollow as indicated at 27 to contain shot or other weighting means which may be added or subtracted at the airport prior to a trip and in accordance with conditions to be met with in the flight. Outward movement of, and the centrifugal effect of, this tip section is controlled by a cable 30. This cable passes successively thru apertures 31 provided one in each rib of each section and thus thru the entire wing and into the hub. It is important that each aperture provide only a close fit for the cable, at least in the vertical plane, since this cable when held taut by centrifugal force forms, in effect, a rigid spar running from hub to tip and alining and supporting the intermediate sections in part. Additional rigidity is provided by abutting shoulders as will be more fully explained hereinafter.

Within the hub is provided a spring-actuated cable reel 31 upon which all of the cables are reeled. The spindle 32 of this spring-actuated reel is fixed to the hub to revolve therewith altho it is understood in connection with reels of this type that the drum 33 of the reel is actuated by the spring 34 to rotate a limited number of turns relative to the spindle 32. In this embodiment the reel is preferably designed to show greater pull when the cable is fully unreeled than when completely reeled. Accordingly the drum acts to feed out the cables only gradually as centrifugal force increases, and to retract the tip gradually as its rotative speed and peripheral speed decrease, and to control the actual span of the wing in accordance with peripheral speed.

Manual means for further controlling the action of the reel, or for temporarily interfering with the automatic operation of the reel, is provided in the form of a friction drum 35 carried on the cable drum 33 and disposed to be contacted by a corresponding friction end 36 of the push-rod. By forcing the end 36 of the non-rotating push-rod against the drum 35 when the rotor is gyrating, will act to retard the cable drum and cause the cables to be wound thereupon to retract the wings. Friction contact between the surfaces 35 and 36 respectively prevent undue strain on the cable at all times.

In operation the wings perform as follows:—
When the rotor is started gyrating by any means such as applied power, the whirling tip section of the wing and the other sections acting one upon the other and upon the tip, pull on the cable and overcome the tension of the spring actuated reel and the sections begin to move out. At a given rotative speed the wing will be fully extended. Except in an unusually weighted tip the mass of all other sections will be greater than the mass of the tip and accordingly the sections will move out as a whole the second section being the first to reach a stop, the others following in succession. When the rotor is about to stop after a flight, the intermediate sections will be retracted successively by the tip section which in turn is drawn in by the cable.

It will be apparent that when the rotor is running at normal speed the cable may be held in a decidedly taut condition by the centrifugal effect of the weighted tip to which it is attached, and this taut cable becomes a boom or spar by which the other sections are partially supported. Even with a heavily weighted tip the entire wing will have a certain degree of flexibility and should be designed to give the degree of flexibility best suited to conditions. Thus in a plane with automatically gyrating wings the flexibility should be sufficient to permit of coning and to provide the greatest degree of stability. Should it be required to lessen the rigidity or increase the flexibility, it is only required that the friction surface of the push rod be brought into contact with just enough pressure to cause the reel to carry some of the centrifugal force of the tip rather than have too much of this force carried thru the wing as a whole.

At this point it should be explained that even were the tip of negligible weight the mass of each section acts upon all inner sections and acts to force the shoulders into contact. These shoulders should be accurately machined or formed to insure even, non-rocking contact and the depth and character of these shoulders has much to do with effective rigidity produced by the centrifugal force of all intermediate sections. For example; should the reel be adjusted to offer very little pull on the cable, then the centrifugal force of the heavy high-speed tip section would be thrown largely on the other sections, and with pronounced square shoulders the wing would be quite rigid. If now the drum or reel is caused to exert more pull on the cable, then the centrifugal force of the tip acting on the other wing sections would be reduced and the wing would be less rigid.

However, if the entire force of the weighted tip were to be taken by the cable and, were the other wing section so light as to provide very little rigidity thru centrifugal force, then the effective rigidity of the wing as a whole would be determined by the cable alone. It will be seen now that means for varying the weight of the tip and means for varying the amount of the centrifugal force carried by the cable direct, provide for any desired degree of rigidity or flexibility as the case may be.

Where the rotor as a whole is employed for helicopters or for jump-take off in gyratory winged planes many advantages are manifest. For example, if the pitch is made too great as by advancing the blades too far so as to tend to stall the motor, the reel will act automatically to partially retract the wings to reduce the load. Thus, regardless of the angle of attack the motor may be operated at maximum speed and maximum torque in order to insure quickest possible take-off; provided of course that the characteristics of the reel and its spring are properly coordinated with the power curve of the motor employed to drive the rotor. Another advantage of the described rotor is that it may be controlled so that in vertical take-off or landing the wings may be partially retracted by manual control of the push rod so that the reduced wing span may be rotated at higher speed and greater angle of attack than would be possible with full span. It is an actual fact that a rotor designed for best possible efficiency as lifting and stabilizing means for an automatically gyrating job cannot possibly be most efficient as a power driven take-off means. Actually a large swept-disc area with wings of low angle of incidence is required in flight while smaller diameter higher speed propeller with greater angle of attack is required for most efficient take-off. The present invention provides the two extremes in one unit.

For higher than normal flying speed the described rotor is made most efficient since it may safely be operated at higher than normal speed by reduction of swept-disc area simultaneous with reduction of angle of attack in conformity with the increased speed of the rotor. In diving the wings may be fully retracted. Even with the small areas of the fully retracted wing the act of advancing the retracted wings to a high angle of attack, when the ship is in a dive, will result in such automatic acceleration of rotation as to cause the wings to quickly move out automatically to a span sufficient to bring the ship out of the dive without need for the wings to be expanded so far as to become subjected to undue strain.

In fact those skilled in the general art of aerodynamics and in possession of a rotor such as this invention discloses, will be enabled to meet a wide variety of operating conditions whereas such skilled persons are well aware that any fan, rotor, turbine, windmill, paddle, propeller, helicopter etc., shows best performance under one given combination of load and speed whereas any such device in which both the pitch as well as the span or diameter can each be changed thru a wide range independently and/or simultaneously, a wide variety of speed and load conditions can be met with high efficiency.

It goes without saying that in the art of heavier than air flying machines the provision of wings of variable span and variable angle of attack together with propelling means of both variable angle of attack and variable diameter and speed can combine to make possible heretofore impossible performance; whereas, prior to this invention the art of flying has been most seriously impeded by the fact that a machine designed to take-off from ground with safety and to land slowly is by no means the most efficient machine when once in the air.

In the diagram Figure 4 I have shown a wing which, by reason of proper machining of the section shoulders, takes on a forwardly bowed form. This form I believe to be best suited to gyratory wings since its entire leading edge moves thru the air always with a slicing action. The cable becomes disposed so that a part of the cable is behind the center of lift of the wing and other parts are disposed forwardly of the center of lift. This disposition of stresses due to lift and due to the various peculiar points at which the cable supports the individual wing sections, produces a wing which is peculiarly resistant to twist altho this wing is capable of being retracted to the same compact positions as is the type of wing previously described.

It will be noted that in both types of wing manual retraction of the wing is easily accomplished when the ship reaches the ground and this feature alone will overcome the great objection to gyratory winged planes which after a successful flight insist on turning over as soon as they reach the ground, by reason of the inertia of the large disc area of the rotor. With my retractile wing sudden retraction of the wing brings the stored energy of the gyrating mass down to a small circumference so close to the hub and pylon as not to overturn the ship. Once the wings are retracted they are so compact in assembly that if the body of the airplane is immediately converted to an automotive vehicle the same can weather wind storms and negotiate curves at high speed without the dangers incident to flying vehicles which, even tho their wings can be "folded", cannot reduce the length of the wing and must always transport said cumbersome and fragile articles.

It may be said of my improved wing that while it is suitably flexible for movement in the vertical plane it is quite rigid and resistant to distortion on the horizontal plane; the latter by reason of the fact that the shoulders of the sections are longer than they are deep, in the same proportion that the chord of an airfoil section is greater than the depth or thickness. Further, I have found, and particularly in the wing shown in Figure 4, that the arcuate character of the shoulders at the leading edge of the sections and the very acute V shape of the shoulders and sections at the trailing edge, make for decided resistance to forces which tend to curve the wing rearwardly. In other words my improved wing has controlled flexibility in directions where movement is desirable, and has ample rigidity in planes where appreciable distortion would be objectionable.

Various modifications of the rotor shown herein, and various applications other than those mentioned of this rotor or its modifications, will suggest themselves to the minds of those skilled in aerodynamic arts, and any combination claimed hereinafter applied to any machine whatsoever for any purpose whatsoever is within the scope of this invention.

That which I claim as new and patentable is:—

1. In an airplane rotor a plurality of telescopic wings projecting from said rotor, a drum in said rotor mounted to revolve independently thereof and connected with said rotor by a coiled spring causing the drum to normally revolve with said rotor, a cable to each wing connected at one end to the tip of the corresponding wing and at the other end to said drum, and means for retarding rotation of said drum to reel said cable to retract said wings.

2. In a gyratory airplane wing, a plurality of wing sections of successively reduced chord, thickness and angle of incidence respectively; each section being tubular and provided at its inner end with an external shoulder fitting slidably within the next larger section and provided at its outer end with an internal shoulder fitting slidably over the next smaller section, the inner shoulder of each section being inclined with respect to the section whereby the wing as a whole has a spiral inclination.

3. The wing as in claim 2 and further including a cable fixed at one end to the outermost section and passing movably thru the other sections.

4. The wing as in claim 2 and further including a hub to which said wing is attached, means for changing the angle of attack of said wing, a spring actuated drum in said hub to normally revolve therewith, a cable connecting said drum with the outermost section of said wing, and means operable to retard rotation of said drum during rotation of said hub.

5. In an airplane, a gyratory rotor for lifting the airplane, a hub to said rotor, a plurality of blades projecting radially from said hub and each comprising a plurality of sections of successively-outwardly reducing chord, thickness and angle of incidence respectively, each section having at its inner end an external shoulder fitting slidably in the next larger section and having at its outer end an internal shoulder fitting slidably over the next smaller section, a cable passing movably thru all intermediate sections and connected to the outermost or tip section, a spring actuated drum in said hub normally revolving therewith and connected with said cable and operable to automatically retract the wing when centrifugal force is reduced, and means for retarding said drum at will during gyration of said rotor and hub.

6. The airplane as in claim 5 and further including means operable to change the angle of attack of said wings during gyration.

THOMAS ASH, Jr.